United States Patent
Lovell et al.

(10) Patent No.: US 10,564,890 B2
(45) Date of Patent: Feb. 18, 2020

(54) RUNT HANDLING DATA STORAGE SYSTEM

(71) Applicant: Seagate Technology LLC, Cupertino, CA (US)

(72) Inventors: Matthew Lovell, Longmont, CO (US); Thomas V. Spencer, Fort Collins, CO (US); Ryan James Goss, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 27 days.

(21) Appl. No.: 15/643,557

(22) Filed: Jul. 7, 2017

(65) Prior Publication Data

US 2019/0012115 A1    Jan. 10, 2019

(51) Int. Cl.
*G06F 3/06* (2006.01)

(52) U.S. Cl.
CPC .......... *G06F 3/0659* (2013.01); *G06F 3/0608* (2013.01); *G06F 3/0611* (2013.01); *G06F 3/0656* (2013.01); *G06F 3/0679* (2013.01); *G06F 3/0688* (2013.01)

(58) Field of Classification Search
None
See application file for complete search history.

(56) References Cited

U.S. PATENT DOCUMENTS

| | | | | |
|---|---|---|---|---|
| 5,420,983 A * | 5/1995 | Noya | .................. | G06F 12/0804 710/30 |
| 5,630,075 A * | 5/1997 | Joshi | .................. | G06F 12/0804 711/100 |
| 6,085,287 A * | 7/2000 | O'Neil | ................ | G06F 12/0866 711/113 |
| 6,330,640 B1 | 12/2001 | Williams et al. | | |
| 6,334,171 B1 * | 12/2001 | Hill | ..................... | G06F 9/30043 711/119 |
| 6,433,787 B1 * | 8/2002 | Murphy | ................ | G09G 5/363 345/556 |
| 6,463,478 B1 * | 10/2002 | Lau | ......................... | H04L 29/06 709/224 |
| 6,597,693 B1 * | 7/2003 | Leung | ................... | H04L 49/351 370/229 |
| 6,668,304 B1 | 12/2003 | Sutran et al. | | |

(Continued)

OTHER PUBLICATIONS

Accelerating Enterprise Solid-State Disks with Non-Volatile Merge Caching by Smullen IEEE (Year: 2010).*

(Continued)

*Primary Examiner* — Paul M Knight

(74) *Attorney, Agent, or Firm* — Hall Estill Attorneys at Law

(57) ABSTRACT

A data storage system may have a number of data storage devices that each have a non-volatile memory connected to a memory buffer. The memory buffer can consist of a map unit having a predetermined size. In receipt of a data sector into the map unit of the memory buffer, the data sector may be identified as a runt with a runt module connected to the memory buffer and the non-volatile memory. The runt module can generate and subsequently execute a runt handling plan to fill the size of the map unit before storing the filled map unit in the non-volatile memory.

19 Claims, 4 Drawing Sheets

(56) References Cited

U.S. PATENT DOCUMENTS

| | | | |
|---|---|---|---|
| 6,671,747 B1* | 12/2003 | Benkual | G06F 9/30043 710/1 |
| 6,795,894 B1 | 9/2004 | Neufeld et al. | |
| 7,152,231 B1* | 12/2006 | Galluscio | G06F 9/544 719/312 |
| 7,454,563 B2 | 11/2008 | Song | |
| 8,205,059 B2 | 6/2012 | Wu et al. | |
| 9,285,996 B2 | 3/2016 | Butt et al. | |
| 9,612,956 B2 | 4/2017 | Feldman et al. | |
| 9,818,476 B1* | 11/2017 | Ballapuram | G06F 12/0246 |
| 9,940,241 B1* | 4/2018 | Mehrotra | G06F 3/0613 |
| 2003/0120797 A1* | 6/2003 | Brodeur | H04L 49/90 709/236 |
| 2003/0172229 A1* | 9/2003 | Takasugi | G06F 3/0614 711/112 |
| 2005/0066166 A1* | 3/2005 | Chin | H04L 12/66 713/165 |
| 2006/0069875 A1* | 3/2006 | Lai | G06F 12/0859 711/133 |
| 2008/0140934 A1* | 6/2008 | Luick | G06F 12/0855 711/117 |
| 2009/0168525 A1* | 7/2009 | Olbrich | G06F 13/1657 365/185.11 |
| 2010/0312953 A1* | 12/2010 | Allen | G06F 12/0246 711/103 |
| 2012/0137059 A1* | 5/2012 | Yang | G06F 3/0611 711/104 |
| 2012/0144096 A1* | 6/2012 | Schuette | G06F 3/061 711/103 |
| 2012/0155493 A1* | 6/2012 | Biehler | H04L 12/4035 370/474 |
| 2013/0007381 A1* | 1/2013 | Palmer | G06F 12/0246 711/154 |
| 2013/0246721 A1* | 9/2013 | Fukutomi | G06F 3/0604 711/155 |
| 2013/0246892 A1* | 9/2013 | Au | G06F 11/1008 714/773 |
| 2014/0258630 A1* | 9/2014 | Busaba | G06F 12/0862 711/130 |
| 2015/0293858 A1* | 10/2015 | Raam | G06F 21/606 713/193 |
| 2016/0034394 A1* | 2/2016 | McKean | G06F 12/0806 709/217 |
| 2016/0077960 A1* | 3/2016 | Hung | G06F 12/0246 711/103 |
| 2016/0246670 A1* | 8/2016 | Mateescu | G06F 11/1008 |
| 2017/0163986 A1* | 6/2017 | Jacobson | H04N 19/137 |
| 2017/0315922 A1* | 11/2017 | Guthrie | G06F 12/0897 |
| 2017/0351700 A1* | 12/2017 | Takata | G06F 3/06 |

OTHER PUBLICATIONS

Zombie Memory: Extending Memory Lifetime by Reviving Dead Blocks by Azevedo (Year: 2013).*

Packet splitting and reassembly as found on the University of Bergen website at http://www.ii.uib.no/~magnus/TCP-6.html (on wayback Jun. 2016) (Year: 2016).*

Hierarchical Clustering of Time Series Data Streams by Rodrigues (Year: 2007).*

* cited by examiner

RUNT HANDLING DATA STORAGE SYSTEM

SUMMARY

In accordance with various embodiments, a data storage system has a number of data storage devices that each have a non-volatile memory connected to a memory buffer. The memory buffer consists of a map unit having a predetermined size. In receipt of a data sector into the map unit of the memory buffer, the data sector is identified as a runt with a runt module connected to the memory buffer and the non-volatile memory. The runt module generates and subsequently executes a runt handling plan to fill the size of the map unit before storing the filled map unit in the non-volatile memory.

DETAILED DESCRIPTION

It is initially noted that a runt is hereby meant as a proper subset of data to be stored in a given map unit.

As greater amounts of data are generated and transferred, the speed and reliability of data storage is emphasized. Greater numbers of mobile computing devices, such as smartphones, tablet computers, household devices, and watches, have allowed users to temporarily and permanently store increasing volumes of data across wired and wireless networks.

While the data capacity of data storage systems can accommodate the increasing amount of data being generated, data transfer speed into, and out of, data storage systems has been stressed. The use of solid-state data storage, such as flash memory, has provided faster data access and smaller physical form factors, but with a cost of greater data processing and maintenance along with an endurance limit. For instance, flash memory cannot be overwritten in-place and has a limited lifespan that corresponds with a variety of maintenance and data access operations that have relatively high cost in terms of processing and execution time. These issues are compounded when data entering a flash memory data storage system is in a form that requires additional processing to fit the operational parameters of flash memory.

It is noted that the writing of a runt data sector is no different than the writing of a non-runt, except for the writing of the runt is to less than a complete map unit. Thus, storing data in a new map unit involves newly-provided write data to get combined with each other, or with other existing, unwritten data to fill a map unit that can be written to flash memory. While various embodiments discuss tracking individual data sectors, such activity is not required and map unit can be asserted at the lowest level of system granularity.

Accordingly, assorted embodiments are directed to a data storage system employing a runt module that identities and handles data sectors that initially do not fit the operational parameters of flash memory. The ability to intelligently handle runt data sectors mitigates the system performance bottlenecks associated with servicing data read, data write, and data maintenance operations with non-volatile memories that are not rewritable in-place. It is noted that some embodiments are generally directed to flash memory, but the use of flash memory is not required or limited as any type of memory and/or data storage structure can be optimized by the assorted aspects of this disclosure.

Figure 1:
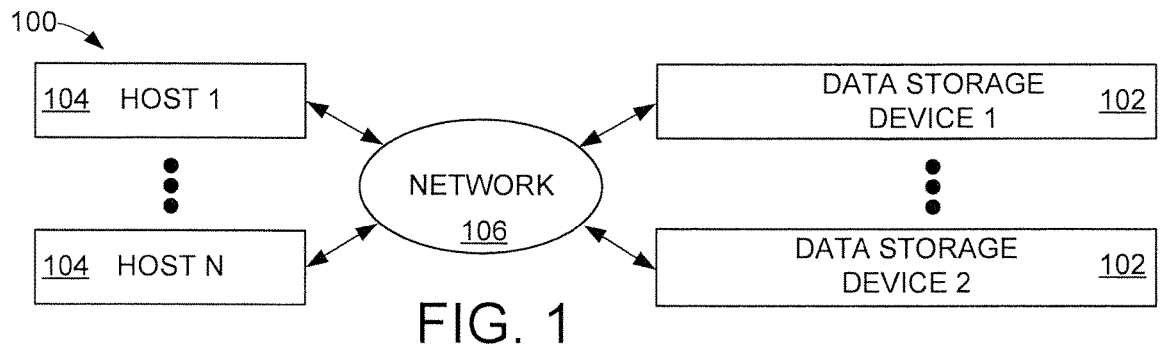
FIG. 1 displays a block representation of an example data storage system in which various embodiments may be practiced.

In FIG. 1, a block representation of an example data storage system 100 is displayed. The data storage system 100 can consist of any number of data storage devices 102 connected to any number of hosts 104 via a wired and/or wireless network 106. It is contemplated that a variety of data storage devices 102 can be utilized with different types of memory and varying performance characteristics, such as capacity, data access latency, and physical size. The various hosts 104 can also be different types of computing devices with different computing capabilities. For example, a first host can be a server while a second host is a network node and a third host is a virtual machine that are each located at different physical addresses, such as dissimilar states, and operate with different purpose and structure.

The network 106 may consist of one or more circuits, switches, routers, and distribution means that can transfer data signals to, and from, the respective data storage devices 102. In some embodiments, the network 106 is arranged as a redundant array of independent devices (RAID) with at least one network controller directs data to multiple data storage devices concurrently, or sequentially, when engaging in striping and/or mirroring operations along with the generation and distribution of parity information about data being stored in the data storage device(s) 102.

Figure 2:
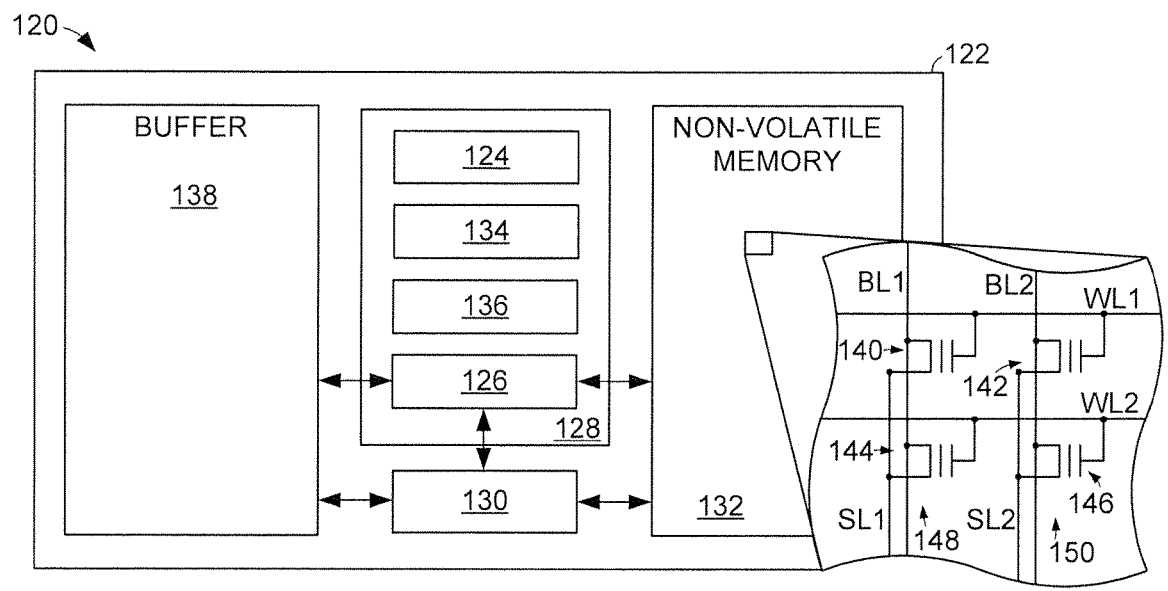
FIG. 2 represents portions of an example data storage device capable of being utilized in the data storage system of FIG. 1

FIG. 2 conveys a block representation of an example data storage device 120 that can be used in the data storage system 100 of FIG. 1 in accordance with some embodiments. The data storage device 120 can be contained within a single housing 122, which may be sealed or unsealed and may be incorporated into a larger physical structure, such as into a data enclosure as part of a data rack.

One or more controllers 124 can be contained in the housing and connected to at least one memory buffer. In the non-limiting embodiment shown in FIG. 2, the data storage device 120 connects a local controller 124, such as a programmable processor or microprocessor, to a static random access memory (SRAM) buffer 126 on a common wafer chip 128, which can be characterized as an on-chip buffer. The local controller 124 can also be connected to one or more off-chip buffers 130, such as a dynamic random access (DRAM) buffer. The on-chip buffer 126 can have faster data access speed than the off-chip buffer 130, due to fewer channel and protocol restrictions, but much lower capacity due to the physical size constraints of the wafer chip 128. Hence, the local controller 124 can selectively utilize the on-chip 126 and off-chip 130 buffers to manage the flow of data into, and out of, the non-volatile memory 132 to optimize performance of the data storage device 120.

The wafer chip 128 may additionally support a compression circuit 134 and an encryption circuit 136 that can individually, and collectively, process data being sent to, and received from, the non-volatile memory 132. The local controller 124 may process, activate, manage, control, and execute the satisfaction of data access requests alone or with other modules of the data storage device 120. One such module can be a runt module 138 that can partially, or completely, utilize the computing power of the local controller 124 to conduct data processing for the data storage device 120, such as data mapping, data maintenance, garbage collection operations, data writes, data reads, and data updates.

As a non-limiting example of the structure of the non-volatile memory 132, NAND flash memory is partially shown schematically with first (BL1) and second (BL2) bit lines operating with first (WL1) and second (WL2) word lines and first (SL1) and second (SL2) source lines to write and read data stored in first 140, second 142, third 144, and fourth 146 flash cells. It is noted that the respective bit lines correspond with first 148 and second 150 pages of memory that are each the minimum resolution of the memory 132. That is, the construction of the flash memory prevents the flash cells from being individually rewritable in-place and instead are rewritable on a page-by-page basis. Such low data resolution, along with the fact that flash memory wears out after a number of write/rewrite cycles, corresponds with numerous performance bottlenecks and operational inefficiencies compared to memory with cells that are bit addressable.

The structural inefficiencies of flash memory are exacerbated by the compression 134 and encryption 136 circuits that respectively operate to decrease the footprint and increase the security of data in the non-volatile memory 132, but at the cost of larger data access latency and processing needed to service a data read and/or data write. In the event data is not provided to a buffer 126/130 in a form that is conducive to compression, encryption, and/or fitment in the non-volatile memory 132, such as being less than a page 148/150 in size, can further degrade data storage system 100 and device 120 performance. Thus, various embodiments are directed to intelligently identifying and handling data that enters a buffer in a form that does not fit into the non-volatile memory.

Figure 3:
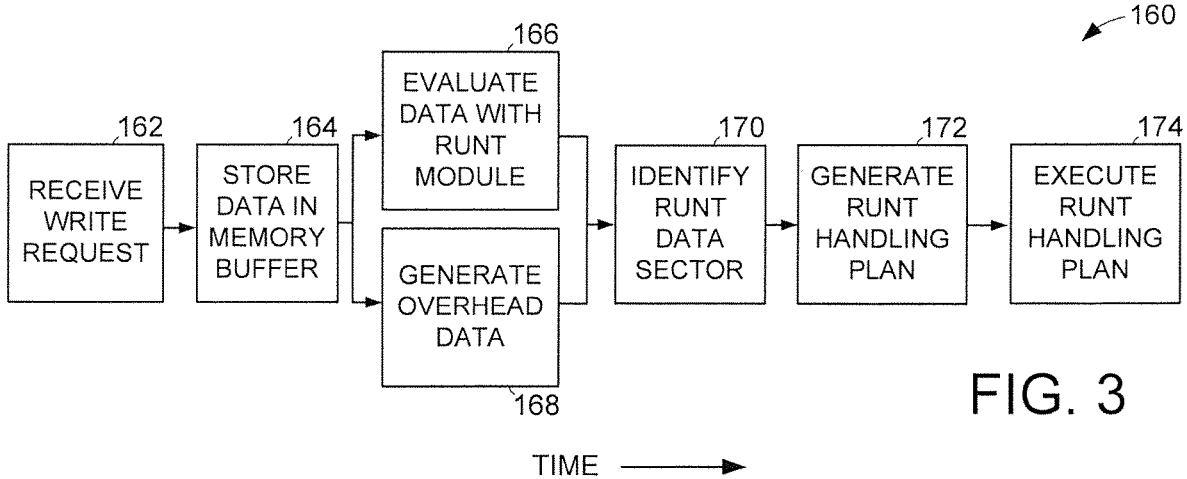
FIG. 3 conveys an example data write scheme that can be executed with the data storage system of FIG. 1 in accordance with various embodiments.

An example data write scheme 160 is depicted in FIG. 3. It is contemplated that the scheme 160 can be executed in a data storage device alone, or in combination with network hardware, such as a network server, controller, or computing device. The write scheme 160 can begin by receiving a write request from a host in step 162 that accompanies user-generated data to be stored in the non-volatile memory of at least one data storage device of a data storage system. The received user-generated data is initially stored in a memory buffer in step 164 that can be resident in an assigned data storage device, such as an on-chip or off-chip buffer, or in network hardware that consists of a buffer. Regardless of the location of the buffer in a data storage system, the buffer can be a volatile or non-volatile type memory that can efficiently store and transfer data.

Once user-generated data is placed in a buffer, a runt module can begin evaluating and/or tracking the data in step 166 continuously or sporadically while overhead data is generated in step 168 to create a data sector. At any time during, or after, step 168, the runt module can identify the data sector as a runt in step 170, which prompts the runt module to generate a runt handling plan in step 172 and carrying out the plan in step 174 to arrange the data sector into a form that is conducive to storage in the non-volatile memory of a data storage device.

Although not required or limiting, a runt does not allow for compression with the compression circuit 134, encryption with the encryption circuit 136, and storage in a full page of non-volatile memory 132. It can be appreciated that storage of data sectors that do not fill a page of non-volatile memory result in unused non-volatile memory space and processing inefficiencies in data management, such as garbage collection operations, that degrade the performance of a data storage system.

However, a runt designation does not necessarily mean a data sector cannot be stored in non-volatile memory, just that it would be inefficient to process the runt in its current state. Hence, the runt module creating and executing the runt handling plan that renders the runt into a form that is more conducive to storage to, and retrieval from, the non-volatile memory. In other words, the runt module can identify a potential or actual runt data sector that will cause performance degradation and take actions that re-configure the runt data sector into a form that more efficiently is stored to, and retrieved from, a non-rewritable in-place.

Figure 4:
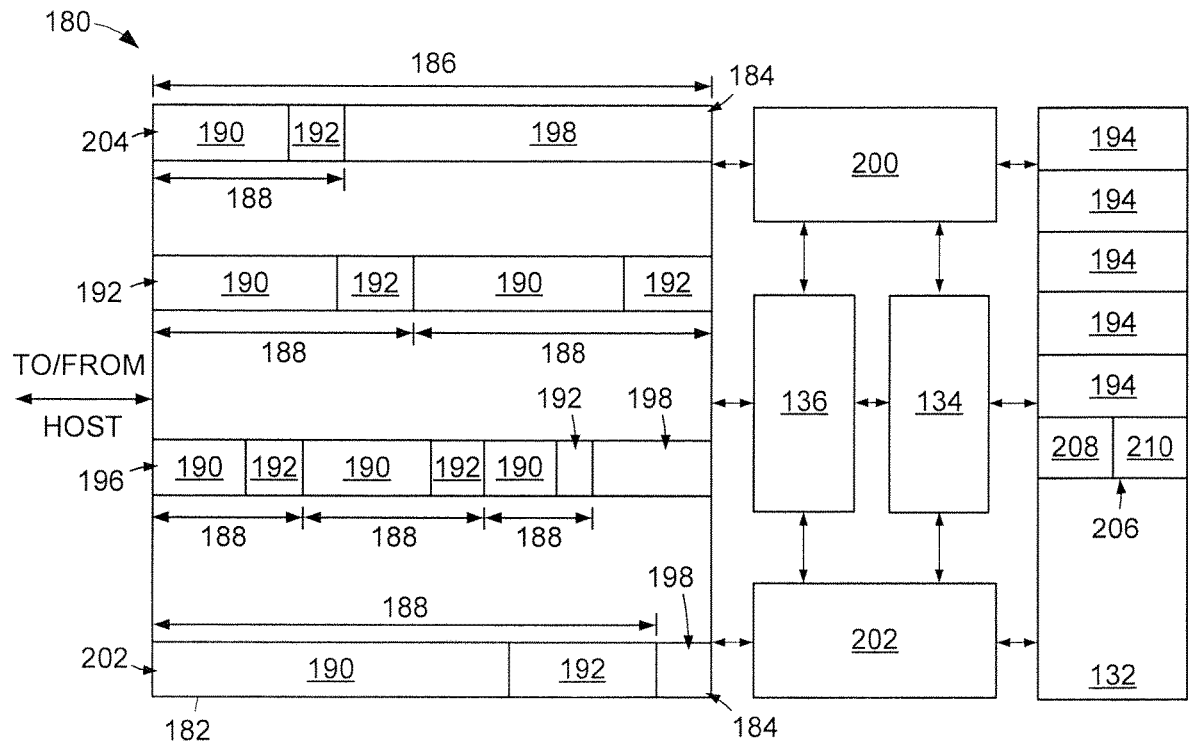
FIG. 4 shows a block representation of portions of an example data storage system configured and operated in accordance with assorted embodiments.

FIG. 4 is a block representation of portions of an example data storage system 180 configured and operated in accordance with various embodiments. The data storage system 180 can have any number of memory buffers 182 that are physically located in network hardware, such as a server or switch, or within a housing of a data storage device, such as on-chip buffer 126 and off-chip buffer 130. The buffer 182 can be arranged into a plurality of map pages 184 that have a predetermined size 186, such as 16 kilobytes. The predetermined size 186 may be chosen to store a certain number of data sectors 188, such as 8 sectors.

A data sector 188, as shown, consists of a user-generated portion 190 and an overhead portion 192. The user-generated data 190 can be received already compiled with the overhead portion 192 or in need of processing by a local, or remote, controller to generate the overhead parameters. Although not required or limiting, the overhead portion 192 can comprise a logical address (LBA), a physical address (PBA), an offset value, a status value, and an error correction code that individually, and collectively, describe the user-generated data 190. For example, The LBA values can designate the assigned memory block for the user-generated data 190, the PBA values designate where the data is to be stored in the non-volatile memory 132, the offset value corresponds with a bit offset along a selected page of memory, the status value indicates the status of the associated user-generated data 190 (e.g., valid, invalid, null, etc.), and the error correction code allows for identification and correction of errors in the user-generated data 190.

When one or more data sectors 188 evenly fit into a map page 184, as illustrated in page 192, the map page 184 will efficiently occupy a memory page 194 after compression and encryption. It is contemplated, but not required, that a compressed and encrypted map page 184 full of data sectors will fill a memory page 194. Irrespective of the relative size of a compressed and encrypted map page 184 full of data sectors compared to a memory page 194, a less-than-full map page, as illustrated in page 196, creates performance bottlenecks due at least in part to the empty map page space 198 that can result in large amounts of unused non-volatile memory space or large processing endeavors to slew the empty map space with other data sectors.

While it is possible that a data sector can be received that fills the empty map page space 198, waiting for such a right-sized data sector causes the map page 184 to be occupied, which can delay and/or complicate moving portions of the buffer 182 to the non-volatile memory 132, particularly when the buffer 182 is purged only when all map pages 184 are full of data sectors 188. Thus, a runt module 200 is tasked with continuously, or sporadically, evaluating the data stored in one or more buffers in a data storage system to proactively and reactively identify runts. By diagnosing the presence of a runt in the buffer 182, the runt module 200 can generate a runt handling plan that allows the runt to be mended and written to the non-volatile memory 132.

As such, the identification of a runt is a self-deterministic evaluation by the runt module 200 that compares the size of the unwritten data sector to the size of the map page 186. With the starting sector address for a write, the number of sectors within the write, and the size of a map unit allows the runt module 200 to identify a runt. Since a map unit is intended to hold the same number of data sectors 188, the determination of a runt by the runt module can be made independently of knowing the compression and read characteristics of the data of the runt.

In the buffer 182 of FIG. 4, it is noted that a map page 184 can be considered full as long as a threshold percentage of the page 184 is occupied by data sectors, as generally shown in page 202. Example map page 204 conveys how a majority of the buffer page size 186, such as 60%, 80%, or 90%, is occupied with data sectors 188, which could correspond with the runt module 200 classifying the data of the map page 204 as a runt, if the threshold is above the size of the data sectors 188, or as a normal map page, if the threshold is below the size of the data sectors 188. Hence, the runt module 200 can preliminarily identify runt data sectors and map pages by evaluating the size of the data sector(s) in a map page 184 compared to a runt threshold.

As a result of compression and encryption of a non-runt map page 184, a memory page 194 may be partially full and the runt module 200 may combine different non-runt map pages 184 to fill a majority, such as 80% or more, of the memory page 194, as shown in memory page 206 that consists of first 208 and second 210 compressed map pages. Through the various evaluations and accommodations with the runt module 200, the memory pages 194 of the non-volatile memory 132 can be filled with compressed data, which optimizes data retrieval performance as well as data maintenance operations, such as garbage collection. Hence, the runt module 200 can optimize operations of upstream memory buffer(s) 182 as well as downstream non-volatile memory 132.

Figure 5:
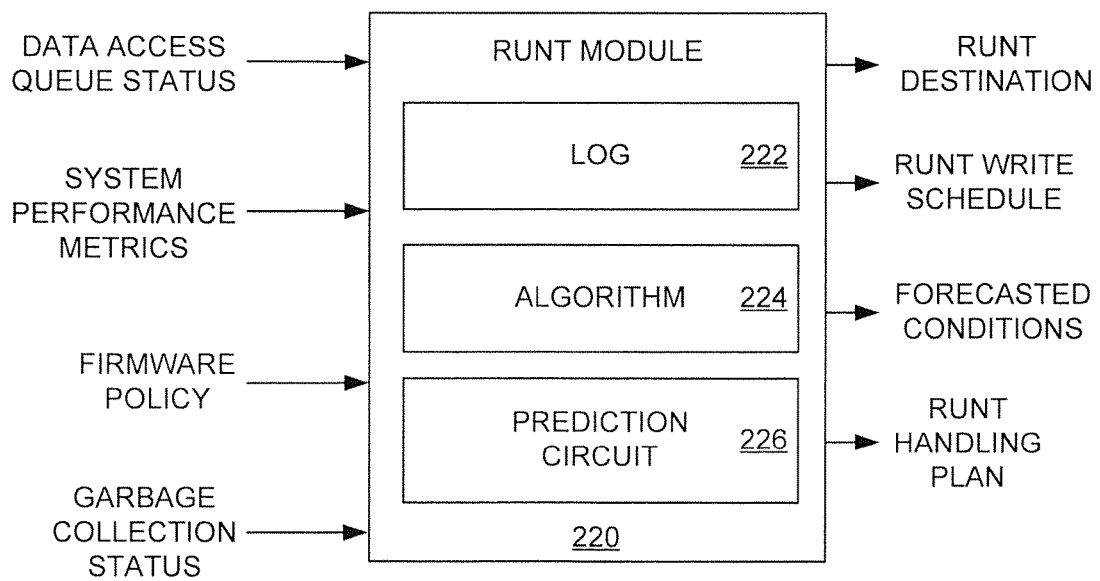
FIG. 5 depicts an example runt module that may be employed in a data storage system in accordance with various embodiments.

FIG. 5 displays a block representation of an example runt module 220 that can be incorporated into a data storage system in accordance with various embodiments. The runt module 220 can be physically resident anywhere in a data storage device, such as in a data storage device or network server. It is contemplated that multiple runt modules 220 are present in a single data storage system, such as in multiple separate data storage devices or in an upstream network controller and downstream data storage device.

A runt module 220 can be wholly contained in a physical portion of a device, such as on wafer chip 128 of FIG. 2, and consist of a log 222, algorithm 224, and prediction circuit 226. The log 222 may be a permanent, or temporary, receptacle for data that can be volatile or non-volatile and may, or may not be physically resident on the same device as the runt module 220. As a non-limiting example, the runt module 220 may utilize an on-chip buffer or an off-chip buffer in combination with other data input and output from the buffers. Alternatively, the log 222 may utilize a dedicated cache memory.

The runt module 220 can store any type and volume of log data pertaining to data storage system operation. In some embodiments, the runt module 220 utilizes a local, or remote, controller to store performance metrics associated with data writes, data reads, and data maintenance. For instance, the runt module 220 can store data latency, data volume, bit error rate, duty cycle, and processing usage as log data in one or more logs 222. It is noted that the runt module 220 may choose to log different performance parameters for different types of system operations, such as for data writes compared to maintenance operations.

One or more algorithms 224 can be employed by the runt module 220 to determine if a data sector/map unit/map page is a runt and subsequently generate a runt handling plan. The runt module 220 utilizes a single algorithm 224 stored in a local buffer, or memory, in some embodiments while other embodiments utilize multiple different algorithms concurrently, or consecutively, to identify and handle a runt. The logging of data with the runt module 220 allows for algorithms to evolve over time to more quickly, and accurately, identify a runt along with more efficiently developing a plan to handle the runt. That is, data in the log 222 can be used to modify an algorithm 224 in response to experienced data access operations.

While the runt module 220 can reactively identify runt data sectors/map units/map pages with the log 222 and algorithm(s) 224, the runt module 220 can also predictively forecast a runt and different handling options. The runt module 220 can intake information about pending data accesses along with current system performance metrics and existing firmware policies and employ the prediction circuit 226 to forecast when a runt will appear in the memory buffer and/or in the non-volatile memory. The prediction circuit 226 may identify a future runt due to detected trends that are similar to past logged events or due to pending data accesses that will likely trigger a firmware policy that will result in a runt.

The prediction circuit 226 can concurrently forecast future runts while evaluating multiple different runt handling plans. Although not required or limiting, the prediction circuit 226 can utilize the data of the log 222 to estimate the execution of multiple different runt handling situations along with the performance of the data storage system after the runt has been handled according to the hypothetical plan. In other words, the prediction circuit 226 can simulate different ways of handling a runt and the consequential system performance during, and after, the runt is handled. Such evaluation of a variety of different plans in combination with the system performance results allows the runt module 220 to select al runt handling plan that provides optimal short-term and long-term system performance, such as minimal data access latency, error rates, and/or processing volume.

As a result of the reactive and proactive capabilities of the runt module 220, a runt handling plan can be generated and scheduled. The runt module 220 may delay the execution of a runt handling plan to accommodate other system operations, such as higher priority data reads or writes. The runt module 220 can, as part of a selected runt handling plan, direct a runt data sector/map unit/map page to a different memory location, such as a cache memory. The movement of a runt may, or may not, be scheduled to coincide with a correction strategy that configures at least one runt to efficiently fit in a memory page of the non-volatile memory. That is, the runt module 220 can generate a correction strategy as part of a runt handling plan to alter a runt to be more conducive to the non-volatile memory and firmware policies regarding data writing, reading, and maintenance.

Figure 6:
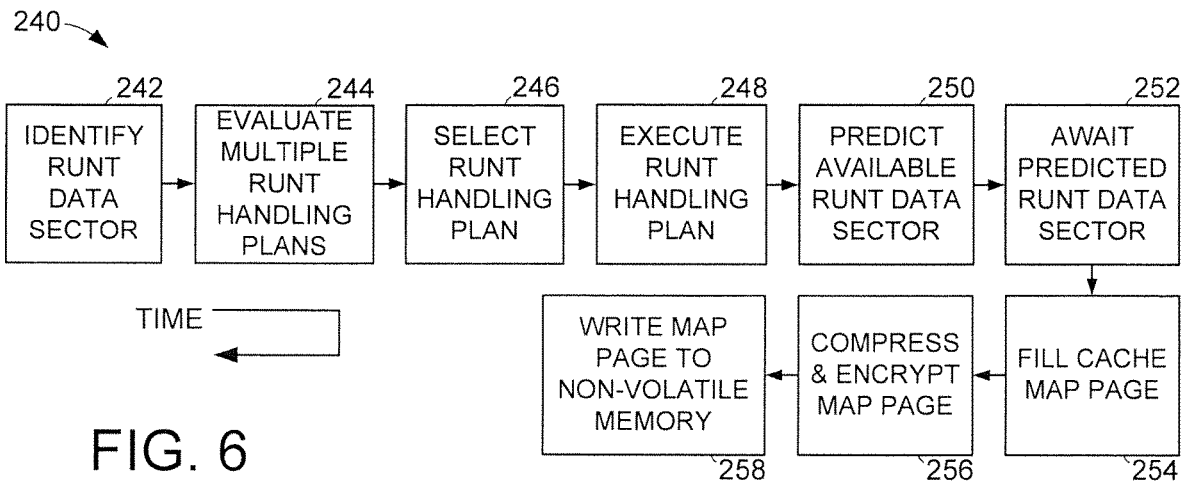
FIG. 6 illustrates an example runt handling plan that can be carried out with the data storage system of FIG. 1 in accordance with some embodiments.
Figure 7:
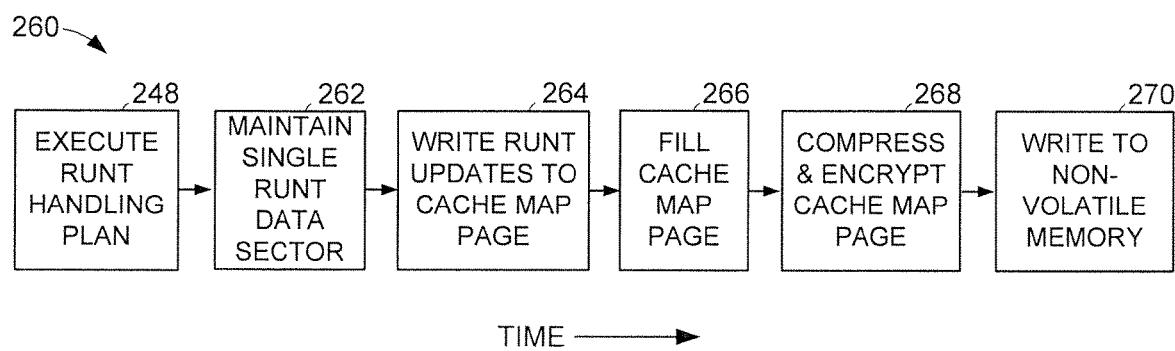
FIG. 7 shows an example runt handling plan capable of being executed with the data storage system of FIG. 1 in accordance with various embodiments.
Figure 8:
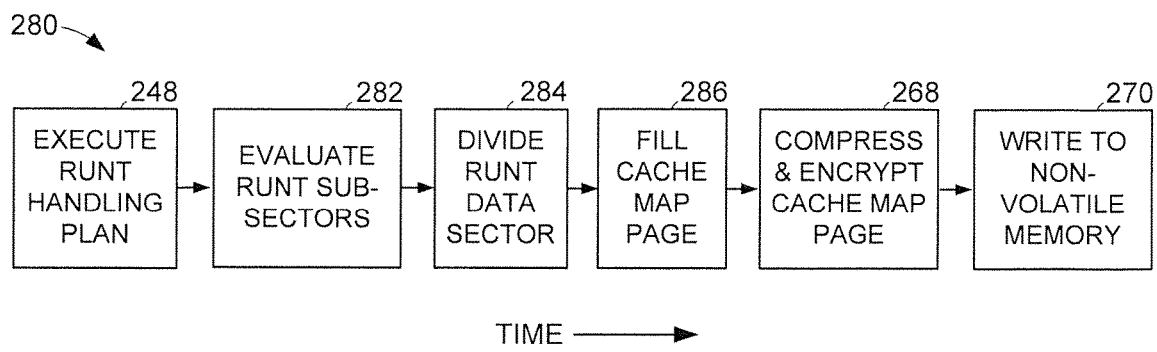
FIG. 8 displays an example runt handling plan that can be carried out with the data storage system of FIG. 1 in accordance with assorted embodiments.

FIGS. 6, 7, and 8 respectively depict different example runt handling plans 240, 260, and 280 that can be executed by a data storage system employing the runt module of FIGS. 4 and 5. The runt handling plan 240 of FIG. 6 begins with a runt module identifying a runt data sector, map unit, and/or map page in step 242. The runt module evaluates multiple different runt handling plans that consist of different runt correction strategies in step 244 prior to selecting a runt handling plan in step 246. It is noted that the runt module can generate a new runt handling plan in step 244 or select a pre-existing plan from a logged list of previously executed, or modeled, plans.

Step 248 then begins execution of the selected runt handling plan by moving the runt data sector to a different memory, such as a non-volatile cache memory. The runt module can utilize the prediction circuit to subsequently predict in step 250 if and when another runt data sector will be available to combine with the cached runt data sector to make a complete map page. That is, step 250 can analyze various system characteristics, such as pending data write requests, to forecast if a second runt data sector is likely to occur in the buffer memory that can be combined with the cached runt data sector to fill a map page.

If a second runt data sector that is combinable with the cached data sector is already present, or is predicted to occur, step 252 awaits the second runt data sector being moved to the cache memory. If a combinable second runt data sector is not present or forecasted in the near future, such as within the next second, hour, or day, the runt module can move the initial runt data sector to a non-volatile memory location in step 254, if the cache memory was not already non-volatile. It is contemplated that step 254 moves the runt data sector to a dedicated non-volatile runt memory, such as rotating hard disk drive or slow solid-state memory, that is separate and different than the cache memory.

Once two or more different runt data sectors have been combined in the cache memory to provide a full map page, step 256 compresses and encrypts the combined runt data sectors in route to writing the cached map page into non-volatile memory in step 258. Accordingly, the runt handling plan 240 generated by the runt module can remove runt data sectors from the buffer memory, which frees up fast buffer capacity, and combine runt data sectors to result in a map page that can efficiently be written to the non-volatile memory. The ability to utilize the prediction module to forecast future runt data sector availability allows the runt module to efficiently place a runt data sector in a location that minimally affects system data storage performance.

FIG. 7 conveys another example runt handling plan 260 that can be generated and carried out by a runt module of a data storage system. The runt handling plan 260 can begin similarly to plan 240 with a runt data sector being identified and subsequently segregated from the buffer memory to a separate cache memory in step 248. Instead of filling a map page in cache with multiple runt data sectors, as in plan 240, plan 260 maintains a single runt data sector in the cache memory in step 262. Such runt data sector maintenance can write updates and other overhead data pertaining to the user-generated data of the runt data sector in step 264 until the map page of the cache memory is filled in 266. The full cache memory map page triggers step 268 to compress and encrypt the cache map page that contains the single runt data sector prior to writing the map page to the non-volatile memory in step 270.

It is contemplated that at least some of the steps of plan 260 can be employed as part of plan 240 in the event the runt module does not predict an additional runt data sector to be cached in a reasonable time. Thus, the runt module can pivot between different runt handling plans in response to actual, or predicted, system parameters. With the runt data sector maintenance of plan 260, the runt module can conduct a variety of different operations to fill the map page. For instance, the runt module can generate additional error correction codes, security fields, and new overhead data in an effort to fill the map page. The runt module, in some embodiments, writes system-level criteria to fill the map page, such as garbage collection information, write counts, and error rate. Accordingly, the runt module can intelligently fill a map page despite the presence of a runt data sector.

Another non-limiting example of a runt handling plan 280 is conveyed in FIG. 8 that can be generated and executed by one or more runt modules in a data storage system in accordance with various embodiments. Instead of supplementing a runt data sector to fill a map page, as in plans 240 and 260, plan 280 divides the runt data sector in step 282 to efficiently fill one or more map pages. Step 282 can involve reactive and proactive evaluations that identify how and where to position runt data sub-sectors. It is contemplated that step 282 evaluates the availability of forecasted runt data sectors to determine how to divide a runt data sector into smaller sub-sectors in step 284.

A non-limiting embodiment writes only runt sectors, which were written by the host, and utilize other metadata, such as a mask or a secondary table, to describe a sub-sector. Another embodiment occurs if a host wrote a runt to a map unit one and the runt module can predict if the host with continue to read and write the data as a runt, which can be verified and accommodated with the runt handling plan.

The dividing of a runt data sector in step 284 can split any portion of the data sector, such as the user-generated data alone, overhead data alone, or multiple portions thereof. As a non-limiting example, step 284 can divide user-generated data in half and regenerate overhead data for the respective halves in separate map pages of the cache memory. The ability to intelligently divide a runt data sector to fill existing, partially filled, cache map pages or new, unfilled, cache map pages in step 286 allows the runt module to provide full map pages sooner than with plan 240 where a cache map page remains unfilled until a runt data sector with the right size is encountered.

In some embodiments, the runt module can deviate from one plan, such as plan 240 to plan 280, in response to current, or predicted, availability of runt sectors. For instance, the runt module may initially await a secondary runt data sector to fill a map page with a primary runt data sector and then divide the primary runt data sector into sub-sectors spread over multiple map pages to provide more opportunities for secondary runt data sectors to fill a map page. As another non-limiting example, the runt module can divide each runt data sector into a predetermined sub-sector size, such as a third or half, of a map page in order to fill a map page in step 286 more quickly. It is noted that a divided sub-sector is a stand-alone data sector with user-generated data in combination with overhead data pertaining to the user-generated data.

It is noted that all the map units of a buffer are not required to be the same size. For instance, firmware can override existing map unit size, such as during destaging. For example, a write of 13 sectors may choose to re-align the map units to be a common size that differs from an initial size. Hence, a runt unit can "promote" a runt to be a map unit with a special size or "demote" a map unit to be a runt. If the runt module tracks a large number of runts with a common size the runt module can change the definition of the map unit to align to the size of some, or all, runts. Alternatively, a large number of writes that create runts, but are associated with full map units can trigger the runt module to alter the size of the map unit such that runts are limited, such as growing a map unit size. Such runt/map unit alteration can be conducted reactively or proactively by the runt unit with a runt being designated to be compressed and encrypted individually, or as a set of data sectors.

It is contemplated that runts may be chosen to be written to a different area of the storage media that may be more conducive to the Read-Modify-Write operation needed for mending. That is, NAND Flash may be used for normal map units and smaller MRAM/RRAM non-volatile memory can be used to store runts pending a mending operation directed by the runt module, or even map units which complete mending.

It is further contemplated, but not required, that runts waiting mending can be treated as "cache" that are managed as a least recently used or most frequently used option on selecting which runts to force mending. If the runt module identifies "hits" on the runts, such as where sectors are overwritten that are already in runt or automatically mending runts because the host subsequently writes the data, the runt module can choose to not destage those runts which are still being updated. Such activity helps limit the overall usage of the flash storage for lower write amplification and longer endurance.

Underlying the implementations of FIGS. 6-8, though, is the fundamental notion that a map unit is an aligned, power-of-2 number of consecutive sectors. Incoming host writes, since they can start and end at any sector, can inherently create runts. A runt-MU is one in which only some subset of sectors has been written. For instance, a long data write can generate a runt buffer at its very beginning and at its very end with all intermediate map units being "full" since all sectors are being updated. Since a data storage system may only provide tracking at a map unit level of granularity, the runt or partially-written map units cannot be written to flash memory as they are. Instead, the runt module must perform a read of the complementary, non-written, sectors from a map unit stored in flash memory and merge the two, as directed by system firmware.

Although the various aspects of the runt handling plans 240/260/280 are not limiting or required, it can be appreciated that the runt module can mix the respective plans and/or generate new runt data sector storage locations to optimize current and predicted system performance. By evaluating current and forecasted data storage conditions, the runt module can generate a runt handling plan that accommodates current data access requests, can adapt to changing system conditions, and takes advantage of predicted data access parameters.

Figure 9:
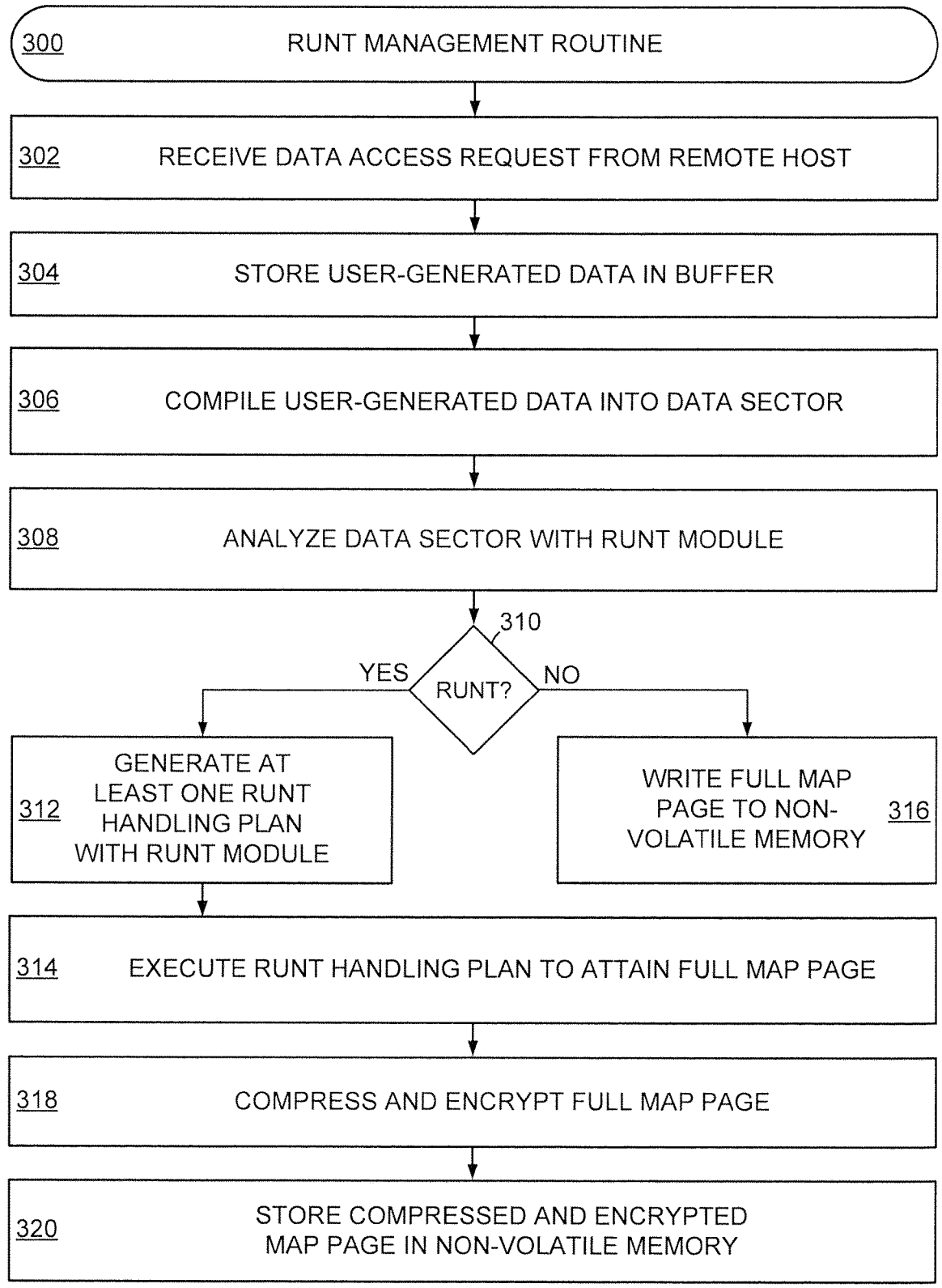
FIG. 9 is a flowchart of an example runt management routine that can be executed by the data storage system of FIG. 1 in accordance with some embodiments.

FIG. 9 is a flowchart of an example runt management routine 300 that can be carried out by the various embodiments of FIGS. 1-5 to execute the assorted embodiments of FIGS. 6-8 along with other, non-illustrated runt handling plans and operations. The routine 300 begins with a data storage system being connected and activated with one or more data storage devices communicating with one or more remote hosts via a network consisting of network hardware. A non-limiting example arranges more than two data storage devices in physically different data storage enclosures in different data racks at different locations connected to more than two different remote hosts via wired and/or wireless interconnections through a network server having a buffer memory.

Step 302 occurs when a data access request (read or write) is sent from a remote system host to one or more data storage devices. It is contemplated that multiple data access requests can concurrently be sent to, and serviced by, multiple different data storage devices, but such operation is not required. The user-generated data associated with a data write request is initially stored in a buffer memory, such as on-chip SRAM, in step 304 prior to being compiled into a data sector in step 306. The compilation of a data sector can involve one or more processes carried out by a local, or remote, controller of the data storage system to generate overhead data that describes the user-generated data.

The compiled data sector resident in a buffer memory either in network hardware, such as a server or switch, or in a data storage device is then analyzed in step 308 by a runt module of the data storage system to determine if the data sector is a runt in decision 310. The evaluation of decision 310 can be a simple comparison of the amount of buffer map page occupied by the data sector to a runt threshold, such as 60%, 75%, or 90%. Alternatively, decision 310 can predict future updates and changes to the data sector that can bring the size of data sector above the runt threshold.

If the data sector in the buffer memory is judged as a runt by the runt module, step 312 proceeds to generate a runt handling plan that is subsequently executed in step 314. Conversely, a non-runt data sector triggers step 314 to schedule and execute storage of the data sector in a non-volatile memory of at least one data storage device of the data storage system in step 316. The generation of a runt handling plan in step 312 can, but is not required to, derive at least one future system operating parameter with the prediction circuit of the runt module. In some embodiments, the prediction circuit provides a number of different operating scenarios, performance metrics, and runt data sector scenarios that aid the runt module in determining where to store the runt data sector and what is the most efficient, and likely, manner of developing the runt data sector into a non-runt that can occupy a memory page in the non-volatile memory once compressed and encrypted.

Step 312 can redundantly store a runt data sector in multiple different memories, such as in a volatile cache memory and non-volatile secondary buffer, or move the runt data sector to a cache memory to free up the buffer memory to service other data access requests. A generated runt handling plan from step 312 may consist of conditions and alternative data sector instructions. For example, a condition may be if the buffer memory is not full to await another runt data sector to fill the buffer map page and if the buffer memory is full, or about to be full, to jettison the runt data sector to cache memory. The runt module can continuously re-evaluate and modify a runt handling plan during step 314, which allows the plan to adapt to changing system conditions, such as high data access request volume.

It is noted that the runt handling plan generated in step 312 can call for the division of a runt data sector at prescribed times, such as when cache memory is not full, or in response to encountered system activity, such as high volume of actual or predicted runt data sectors occurring in the buffer memory. At the conclusion of step 314, the runt data sector will be transformed into a complete map page via execution of the runt handling plan that is compressed and encrypted in step 318 before being stored in the non-volatile memory of at least one data storage device in step 320. It is noted that the various aspects of routine 300 are not required or limiting and, as such, any portion can be changed, moved, or removed just as additional steps and/or decisions can be inserted.

Through the assorted embodiments of FIGS. 1-9, a runt module provides intelligence for a data storage system that can mitigate and/or eliminate performance bottlenecks associated with managing data in a non-volatile memory. The runt module can efficiently evaluate and identify a runt data sector before intelligently generating a runt handling plan that transforms the runt data sector into a map page that can be efficiently stored and retrieved from a solid-state non-volatile memory.

What is claimed is:

1. A method comprising:
activating a data storage device having a non-volatile memory connected to a memory buffer, the memory buffer comprising a map unit having a predetermined size;
receiving a data sector into the map unit of the memory buffer;
identifying the data sector as a runt with a runt module connected to the memory buffer and the non-volatile memory;
generating a runt handling plan with the runt module, the runt handling plan dividing the runt into a first group of multiple sub-sectors in response to a future availability of a secondary runt predicted by a prediction circuit;
executing the runt handling plan to fill the size of the map unit; and
storing the filled map unit in the non-volatile memory.

2. The method of claim 1, wherein the data sector is compiled by the runt module, the data sector comprising a user-generated data portion and an overhead data portion.

3. The method of claim 1, wherein the data sector has a size that is below a threshold volume of the map unit.

4. The method of claim 3, wherein the threshold volume is 70% of the predetermined size.

5. The method of claim 1, wherein the runt handling plan divides the runt into a second group of multiple sub-sectors.

6. The method of claim 5, wherein the multiple sub-sectors are distributed to different map units by the runt module.

7. The method of claim 5, wherein the runt module divides the runt into the second group of multiple sub-sectors reactively and after the dividing the runt into the first group of multiple sub-sectors.

8. The method of claim 1, wherein runt module creates a first sub-sector with a sub-sector size that combines with the secondary runt to fill the map unit.

9. A method comprising:
activating a data storage device having a non-volatile memory connected to a memory buffer, the memory buffer comprising a map unit having a predetermined size;
receiving a data sector into the map unit of the memory buffer;
identifying the data sector as a first runt with a runt module connected to the memory buffer and the non-volatile memory;
generating a runt handling plan with the runt module, the runt handling plan dividing the runt into a group of multiple sub-sectors in response to a future availability of a secondary runt predicted by a prediction circuit;
executing the runt handling plan to fill 80% or more of the size of the map unit with the first runt;
servicing a read request for the data sector from a cache memory of the data storage device; and
storing the filled map unit in the non-volatile memory.

10. The method of claim 9, wherein the runt handling plan moves the first runt from an on-chip buffer to the cache memory as directed by the runt handling plan.

11. The method of claim 10, wherein the runt handling plan fills a map unit in the cache memory with the first runt and updates to the first runt.

12. The method of claim 10, wherein the runt handling plan awaits a second runt to enter the memory buffer with a size that combines with the first runt to completely fill a map unit in the cache memory.

13. The method of claim 9, wherein the runt module generates the runt handling plan to comply with predetermined firmware policy for the data storage device.

14. An apparatus comprising a runt module connected to a memory buffer and a non-volatile memory of a data storage device, the memory buffer comprising a map unit having a size, the runt module configured to identify the map unit storing a runt data sector and to generate a runt handling scheme to fill the size of the map unit, the runt handling plan configured to divide the runt into multiple sub-sectors in response to a future availability of a secondary runt predicted by a prediction circuit to completely fill the map unit.

15. The apparatus of claim 14, wherein the memory buffer and runt module are each physically separated from the data storage device.

16. The apparatus of claim 14, wherein the data storage device comprises a cache memory connected to the memory buffer, non-volatile memory, and runt module.

17. The apparatus of claim 14, wherein the data storage device comprises a compression circuit and an encryption circuit connected between the memory buffer and the non-volatile memory.

18. The apparatus of claim 14, wherein the runt module comprises a prediction circuit and a data log.

19. The apparatus of claim 14, wherein the non-volatile memory comprises flash memory.

* * * * *